(12) United States Patent
Natali et al.

(10) Patent No.: US 9,897,052 B2
(45) Date of Patent: Feb. 20, 2018

(54) HOSE ASSEMBLY FOR AN ENGINE AIR INTAKE SYSTEM

(71) Applicant: CNH Industrial America LLC, New Holland, PA (US)

(72) Inventors: Silvio Natali, Castelvetro (IT); Fabio Pescione, Modena (IT); Luca Boschi, Modena (IT); Stefano Nicola Carrara, Bologna (IT)

(73) Assignee: CNH Industrial America LLC, New Holland, PA (US)

( * ) Notice: Subject to any disclaimer, the term of this patent is extended or adjusted under 35 U.S.C. 154(b) by 59 days.

(21) Appl. No.: 15/103,689

(22) PCT Filed: Dec. 10, 2014

(86) PCT No.: PCT/EP2014/077283
§ 371 (c)(1),
(2) Date: Jun. 10, 2016

(87) PCT Pub. No.: WO2015/086706
PCT Pub. Date: Jun. 18, 2015

(65) Prior Publication Data
US 2016/0312749 A1    Oct. 27, 2016

(30) Foreign Application Priority Data
Dec. 12, 2013    (IT) .............................. MO2013A0339

(51) Int. Cl.
*F16L 11/11* (2006.01)
*F02M 35/10* (2006.01)
(Continued)

(52) U.S. Cl.
CPC ................. *F02M 35/10301* (2013.01); *F02M 35/10157* (2013.01); *F16L 55/02* (2013.01); *F16L 55/052* (2013.01); *F16L 11/11* (2013.01)

(58) Field of Classification Search
CPC .......... F16L 11/15; F16L 11/20; F16L 55/041; F16L 11/11
(Continued)

(56) References Cited

U.S. PATENT DOCUMENTS 3,355,190 A    11/1967    Francis
3,549,176 A *  12/1970    Contreras ............... F16L 51/02
                                                          138/121

(Continued)

FOREIGN PATENT DOCUMENTS

| DE | 1475655 A1 | 3/1969 |
| FR | 1385985 A | 1/1965 |
| JP | 2005090593 A | 7/2005 |

OTHER PUBLICATIONS

International Search Report for PCT/EP2014/077283 dated Jan. 21, 2015.

*Primary Examiner* — Patrick F Brinson
(74) *Attorney, Agent, or Firm* — Richard K. DeMille; Rebecca L. Henkel

(57) ABSTRACT

A hose assembly 20 for engine intake air comprises a hose 22 having connection regions 22a, 22b at first and second ends of the hose and an axially compressible and extendable bellows region 22c disposed between the two connection regions. In the invention, an inextensible inner tube 24 is disposed within the hose 22 which has a gas-impermeable wall. The inner tube 24 has first and second ends 24a, 24b that seal, respectively, against the first and second connection regions 22a, 22b of the hose when the bellows region is compressed. At least one of the first and second ends of the inner tube 24a separates from the adjacent connection region 22a of the hose 22 when the bellows region 22c is extended.

9 Claims, 2 Drawing Sheets

(51) Int. Cl.
*F16L 55/02* (2006.01)
*F16L 55/052* (2006.01)

(58) Field of Classification Search
USPC ........ 138/109, 121, 122, 137; 285/226, 299, 285/300, 374
See application file for complete search history.

(56) References Cited

U.S. PATENT DOCUMENTS

| | | | | |
|---|---|---|---|---|
| 3,837,685 | A * | 9/1974 | Miller | F16L 47/18 138/97 |
| 5,829,483 | A * | 11/1998 | Tukahara | F16L 9/18 138/109 |
| 5,901,754 | A * | 5/1999 | Elsasser | F01N 13/1816 138/118 |
| 6,402,203 | B1 * | 6/2002 | Mathiesen | F16L 25/12 285/224 |
| 7,398,798 | B2 * | 7/2008 | Ostan | F16L 11/15 138/114 |
| 2004/0100096 | A1 * | 5/2004 | Atansoski | F01N 13/1811 285/299 |

* cited by examiner

HOSE ASSEMBLY FOR AN ENGINE AIR INTAKE SYSTEM

CROSS REFERENCE TO RELATED APPLICATIONS

This application is a national stage of PCT application no. PCT/EP2014/077283, entitled "HOSE ASSEMBLY FOR AN ENGINE AIR INTAKE SYSTEM", filed on Dec. 10, 2014, which claims priority from and the benefit of Italian patent application serial no. MO2013A000339, filed on Dec. 12, 2013. This application claims priority of both of the foregoing applications, which are both hereby incorporated by reference in their entirety.

FIELD OF THE INVENTION

The present invention relates to a hose assembly suitable for use in the air intake system of an engine having a charge air cooler.

BACKGROUND OF THE INVENTION

Turbo charging, or supercharging, of engine intake air causes an increase in both the pressure and the temperature of the air. While high pressure is desirable, because it increases the mass of air that can be admitted into the engine cylinders, high temperature reduces the air density and therefore reduces the volumetric efficiency of the engine. For improved performance, it is known to reduce the temperature of the intake air by passing it through a charge air cooler (CAC), also termed an intercooler, which is constructed as a heat exchanger that enables the intake air to be cooled by heat rejection to the ambient air.

It is known to mount the CAC next to, or on, the radiator that cools the engine coolant so that the air flowing through the radiator passes first through the CAC. When, as in the case of an agricultural vehicle, the engine is often operating in a dirty environment, dirt becomes trapped within the CAC and the radiator and they need to be cleaned from time to time to maintain efficient engine operation and avoid overheating.

FIG. 1 of the accompanying drawing shows an arrangement of a CAC 10 mounted on a radiator 12. The CAC 10 is held on the radiator 12 by a bracket 14 that allows the CAC 10 a limited degree of movement away from the radiator to provide access for cleaning.

To avoid the need to disconnect the CAC from the engine intake system during cleaning operations, it is known to use flexible hoses to connect the inlet 16 and the outlet 18 of the CAC to the engine intake system, that is to say to the turbocharger or supercharger and to the engine intake manifold. For this purpose, flexible and extendable hoses are well known that have walls constructed as a bellows, that is to say in the form of a concertina.

OBJECT OF THE INVENTION

The present invention is predicated on the realisation that the bellows of a flexible and extendable hose creates an undesirable pressure drop, because it offers increased resistance to air flow in the hose, and seeks to mitigate this problem.

SUMMARY OF THE INVENTION

According to the present invention, there is provided a hose assembly for engine intake air, comprising an outer hose having first and second ends that serve as connection regions and an axially compressible and extendable bellows region disposed between the two connection regions, characterised by an inextensible inner tube disposed within the outer hose and having a gas-impermeable wall, wherein the inner tube has first and second ends that seal, respectively, against the first and second connection regions of the outer hose when the bellows region is compressed, and wherein at least one of the first and second ends of the inner tube is spaced from the adjacent connection region of the outer hose when the bellows region is extended.

When the CAC is in its operating position, the bellows region of the hose is fully compressed and the inner tube seals at both its ends against the connection regions of the hose. In this way, air can flow smoothly through the inner tube alone without any turbulence being caused by the bellows region. Increased air resistance does occur when the CAC is moved to the cleaning position, when an end of the inner tube separates from the adjacent connection region of the hose and exposes a part of the bellows region of the hose. However, as the engine is not normally operated at times when the CAC is in the cleaning position, the increased air resistance when the bellows region is extended is of no importance. Thus the invention provides a hose assembly that offers low air resistance when the engine is operating yet allows the CAC to be moved to a cleaning position without it having to be disconnected from the engine air intake system.

If the connector of the CAC is only required to move in a straight line, the inner tube can be rigid and only the outer hose needs to be made of a flexible material. However, to allow the CAC to move along a curve, it is possible, in some embodiments of the invention, for both the outer hose and the inner tube to be flexible. This may be achieved if both the outer hose and the inner tube are made of an elastomeric material.

For streamlined air flow, there should be minimal discontinuities in the inner wall of the hose assembly. With this aim in mind, the inner diameter of any connection region of the outer hose that can separate from the inner tube when the hose assembly is extended, may be equal to the inner diameter of the inner tube.

While each of the ends of the inner tube may be designed to separate from its adjacent connection region of the outer hose when the hose assembly is extended, in some embodiments, one of the ends of the tube may be designed to fit within the adjacent connection region of the hose, so as to retain the same relative position both in the extended and compressed stated of the hose assembly. In this case, the inner diameter of one end of the outer hose may be equal to the outer diameter of the first end of the inner tube in order to receive and seal against the first end of the inner tube.

To assist in effecting a good seal with the hose, the second end of the inner tube may have a tapering outer wall. The second end of the inner tube may also be formed with axially extending slots to permit the second end of the inner tube to be compressed radially.

It should be noted that the "sealing" between the inner tube and the connection regions of the outer hose should not be taken to mean hermetic hydrostatic sealing but hydrodynamic sealing. The seal is required to ensure that the entire air throughput passes in a streamlined manner from the inner tube into the connection region of the outer hose. The presence of axial slots in the tapered end of the tube does not interfere with the smoothness of the air flow but serves to achieve a pressure balance between the space within the inner tube and the space lying between the inner tube and the bellows region of the outer hose.

In some embodiments of the invention, external clamping rings are arranged in valleys defined by folds of the bellows and act to compress the bellows against the inner tube. Such clamping rings enable the bellows region to withstand the high pressure generated by the turbocharger.

BRIEF DESCRIPTION OF THE DRAWINGS

The invention will now be described further, by way of example, with reference to the accompanying drawings, in which.

DETAILED DESCRIPTION OF THE EMBODIMENT

Figure 2:
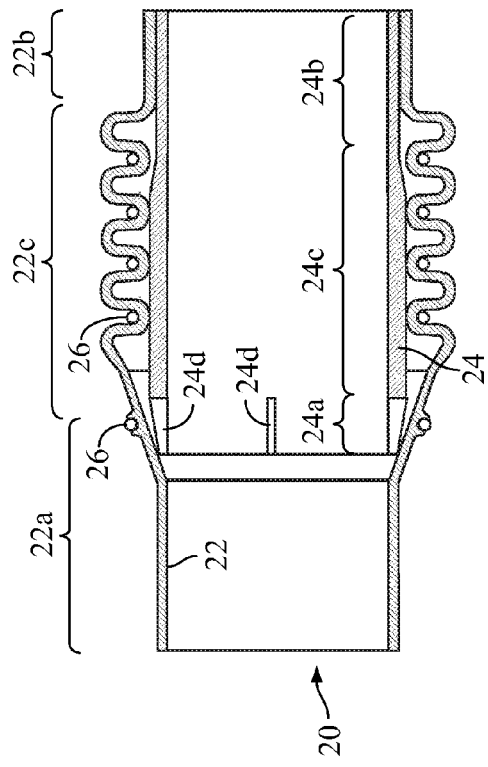
FIG. 2 is a section through a hose assembly of the invention in the compressed state adopted in the operating position of the CAC.
Figure 3:
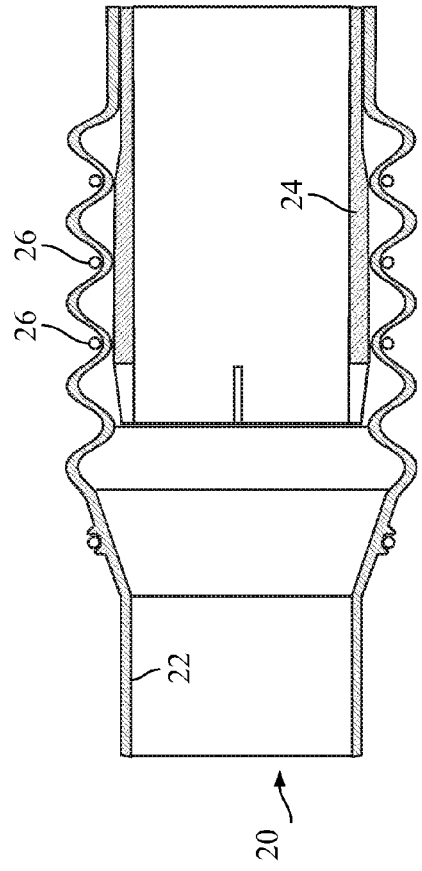
FIG. 3 is a section through the hose assembly of FIG. 2 in the extended state that it adopts in the cleaning position of the CAC.
Figure 1:
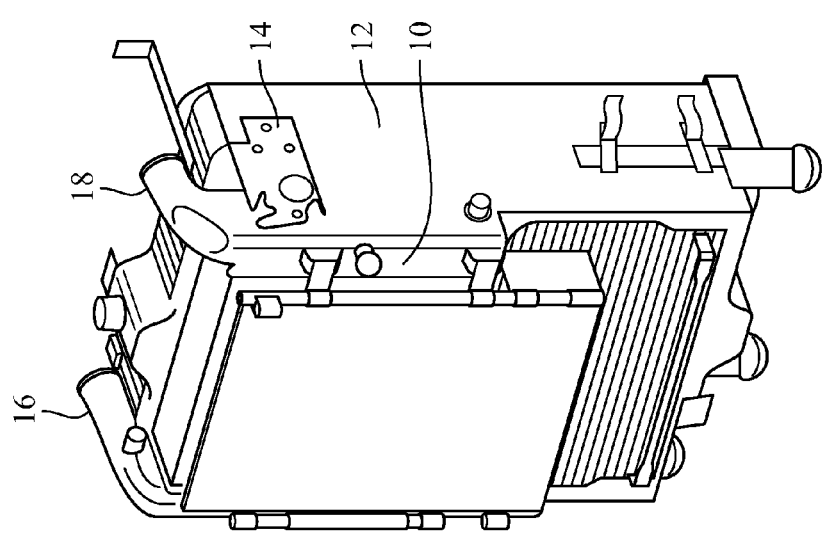
FIG. 1, as earlier described, shows a charge air cooler movably mounted on a radiator.

FIGS. 2 and 3, show a hose assembly 20 composed of an outer hose 22 and an inner tube 24, both made of an elastomeric material. The outer hose 22 has a connection region 22a to be secured to the inlet 16 or the outlet 18 of the CAC 10, for example by means of a jubilee clip (not shown) and an end region 22b to be connected in a similar manner to a pipe leading to a turbocharger or to an engine intake manifold. The region 22c between the two end connection regions 22a and 22b is constructed as a bellows with multiple annular folds that allow it to be extended and compressed.

The inner tube 24, which has a gas-impermeable wall, has a central region 24c, of increased wall thickness and enlarged outer diameter, disposed with the bellows region 22c of the outer hose 22, an end region 24b retained within the end region 22b of the outer hose 22 and an end region 24a that is tapered to effect a hydrodynamic seal against the connecting region 22a of the outer hose 22.

Springs or clamping wires 26 are fitted within the valleys defined by the folds of the bellows region 22c to strengthen the outer hose 22 and compress the bellows radially against the outer surface of the inner tube 24.

In the operating position of the CAC 10, the hose assembly 20 adopts the position shown in FIG. 2. Air that has been compressed by a turbocharger enters the inner tube 24 from the right, as viewed, and flows through the interior of the inner tube 24. As the latter has smooth walls, it creates no turbulence and the air flow therefore meets with minimal flow resistance. On reaching the opposite end of the hose assembly, the air transitions smoothly from the inner tube 24 to the connection region 22a of the outer hose 22.

As the tapered end 24a of the inner tube 22 and the connecting region 22a of the outer hose 22 are pushed against one another, the end of the inner tube 24 is compressed radially. Axially extending slots 24d in the end of the tube enable its diameter to be reduced under the action of the mating tapering surfaces. This creates an effective hydrodynamic seal that minimises air resistance. After initial equalization of the pressures on opposite sides of the inner tube 24, there is be no air movement through the slots 24d to create turbulence in the through flow of the compressed air.

The position of the hose assembly shown in FIG. 3 is that adopted when the assembly is extended to accommodate movement of the CAC 10 to the cleaning position. Despite allowing the movement of the CAC, neither of the connection regions of the outer hose 22 needs to be separated from the pipe to which it is secured. Within the hose assembly, extension of the bellows region 22c causes the end 24a of the inner tube 24 to separate from the connection region 22a of the outer hose 22. Though this disturbs streamline flow through the hose assembly 20, this is unimportant because no air flows through the CAC while a cleaning operation is being performed.

Though the inner tube 24 has been described as being retained at one end within the connection region 22b of the outer hose, this is not essential as the inner tube 24 could float within the outer hose 22 and effect a seal with the outer hose 22 at both its ends, in the manner described for the end 24a, only when the hose assembly 20 is compressed.

The hose assembly 20 in FIGS. 2 and 3 may be connected either to the inlet 16 or the outlet 18 of the CAC. As the internal diameter of the hose assembly is substantially uniform over the entire length of the hose assembly, the direction of air flow, and the orientation of the hose assembly, are not critical.

Figure 4:
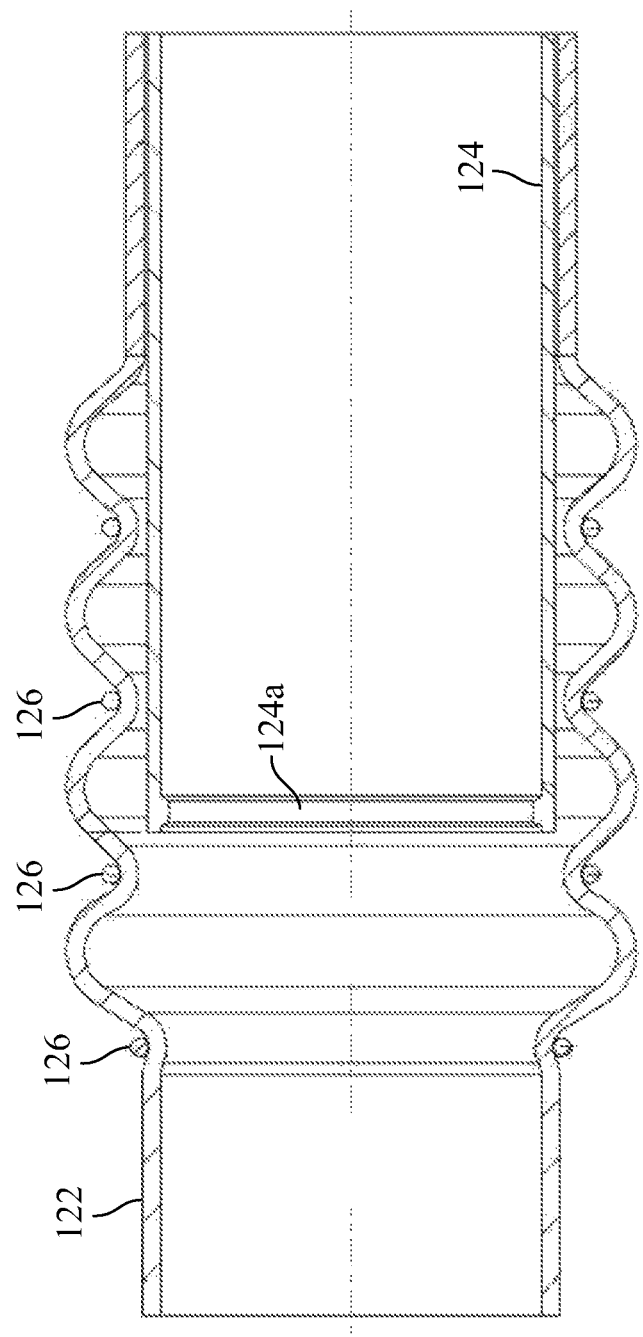
FIG. 4 is a section similar to that of FIG. 4 showing an alternative embodiment of the invention.

The embodiment of the invention shown in FIG. 4 differs from that of FIGS. 2 and 3 in details of the construction of the outer hose 122 and the inner tube 124. Whereas in the embodiment of FIGS. 2 and 3, the tapering outer wall of the inner tube 24 contacts the tapering inner wall of the outer hose 22 to effect a seal, in the embodiment of FIG. 4, it is the axial end surface of the inner tube 124 that contacts the outer hose 122 to effect a seal. The outer hose 122 in this case has a clamping ring 126 at the junction between bellows region and the connection region shown on the left in the drawing. The adjacent end of the inner tube 124 no longer has axial slots and its outer surface is not tapered. Instead, the inner tube 124 has an inwardly projecting rounded annular rib 124a that increases the rigidity of the end of the inner tube 124.

Though the described hose assembly has been described by reference to its application in an engine intake system having a movable component, it will be appreciated that it is not restricted in its use to this application. The invention instead may find use in any application requiring an extendable hose where it is desirable to reduce resistance to flow and an excessive pressure drop across the hose.

The invention claimed is:

1. A hose assembly for engine intake air, comprising an outer hose having first and second ends that serve as connection regions and an axially compressible and extendable bellows region disposed between the two connection regions wherein an inextensible inner tube is disposed within the outer hose and having a gas-impermeable wall, wherein the inner tube has first and second ends that seal, respectively, against the first and second connection regions of the outer hose when the bellows region is compressed, and wherein at least one of the first and second ends of the inner tube is spaced from the adjacent connection region of the outer hose when the bellows region is extended.

2. A hose assembly as claimed in claim 1, wherein both the outer hose and the inner tube are flexible.

3. A hose assembly as claimed in claim 2, wherein the outer hose and the inner tube are made of an elastomeric material.

4. A hose assembly as claimed in claim 1, wherein external clamping rings are arranged in valleys defined by folds of the bellows region of the outer hose and act to compress the bellows region against the inner tube.

5. A hose assembly as claimed in claim 1, wherein the inner diameter of at least one of the connection regions of the outer hose is equal to the inner diameter of the inner tube.

6. A hose assembly as claimed in claim 1, wherein the inner diameter of one end of the outer hose is equal to the outer diameter of an adjacent end of the inner tube and is operative to receive and seal against the adjacent end of the inner tube.

7. A hose assembly as claimed in claim 1, wherein the end of the inner tube that is spaced from the adjacent connection region of the outer hose when the bellows region is extended has a tapering outer wall.

8. A hose assembly as claimed in claim 6, wherein the end of the inner tube that is spaced from the adjacent connection region of the outer hose when the bellows region is extended of the inner tube is formed with axially extending slots.

9. A hose assembly as claimed in claim 1, wherein the end of the inner tube that is spaced from the adjacent connection region of the outer hose when the bellows region is extended is formed with a radially inwardly projecting round rib.

\* \* \* \* \*